March 28, 1961
W. D. SCHAEFFER ET AL  2,977,395
DECHLORINATION OF CHLOROMETHYL COMPOUNDS
Filed Feb. 24, 1959
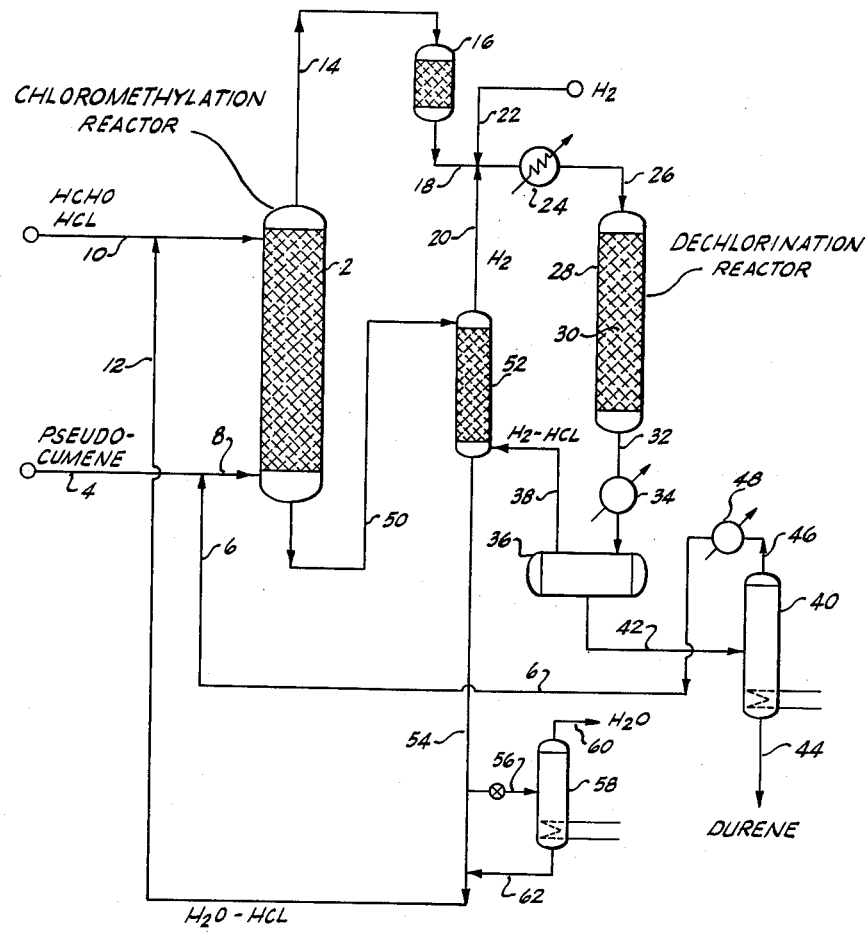
INVENTORS:
WILLIAM D. SCHAEFFER
FRANK H. SEUBOLD JR.
BY *Lannas S. Henderson*
AGENT

United States Patent Office 2,977,395
Patented Mar. 28, 1961

2,977,395

DECHLORINATION OF CHLOROMETHYL COMPOUNDS

William D. Schaeffer, Pomona, and Frank H. Seubold, Jr., Claremont, Calif., assignors to Union Oil Company of California, Los Angeles, Calif., a corporation of California Filed Feb. 24, 1959, Ser. No. 795,082

16 Claims. (Cl. 260—668)

This invention relates to methods for the hydrogenolysis of chloromethylated aromatic hydrocarbons to effect a replacement of the chlorine atom with a hydrogen atom, with resultant formation of an alkaryl hydrocarbon. Briefly, the method comprises contacting the chloromethyl compound plus added hydrogen with a hydrogenolysis catalyst, said catalyst comprising a finely divided noble metal distended upon a carrier such as an alkali- or alkaline earth metal sulfate, e.g., barium sulfate. It has been found that the noble metals retain their activity for long periods of time in this process, when supported on carriers of this nature. Catalysts based on other carriers such as silica or activated carbon are found to be substantially deactivated after about 1 to 2 hours' contact time. The catalysts of this invention however are found to retain their activity indefinitely, i.e., at least several days, and up to several weeks, depending upon purity of the reactants and the particular reaction conditions.

It is known that reactive aromatic hydrocarbons can be easily chloromethylated by simply contacting them with a mixture of formaldehyde and concentrated hydrochloric acid. This provides a convenient method of introducing additional side chains in aromatic hydrocarbons. The resulting chloromethylated products can then be reacted with other reagents to convert them to functional derivatives. For example, they may be oxidized to produce polybasic acids, or hydrolyzed to produce benzyl alcohol derivatives. In processes such as these the chloromethylation step is desirable because of its simplicity, and because of the fact that the chloromethyl group enters the ring selectively in positions ortho and/or para to alkyl groups already on the ring, thus providing a less complex mixture of isomers than might result from other methods of introducing side chains.

The present invention is concerned broadly with methods for converting aryl or alkaryl hydrocarbons to ring-methylated derivatives thereof. For example, it is sometimes desirable to convert benzene or toluene to xylenes. However, conventional alkylation procedures result in the formation of complex mixtures of ortho, meta and para isomers, as well as higher alkylated products. Furthermore, severe conditions of alkylation are generally required to introduce methyl groups, and this commonly results in extensive isomerization and transalkylation with resultant formation of all manner of homologs and isomers, and low yields of the desired product. Chloromethylation however can be readily controlled so as to yield only ortho and/or para isomers, with little or no poly-chloromethylated products. It would hence be desirable to provide economical methods for converting chloromethylated aromatics to the corresponding methyl compounds. To the best of our knowledge, previous methods for replacing the chlorine atom of chloromethylated compounds with hydrogen have been too expensive and/or ineffective for practical purposes.

It is accordingly an object of our invention to provide economical methods for the hydrogenolysis of chloromethylated aromatic hydrocarbons. A broader objective is to provide economical methods for converting aryl or alkaryl hydrocarbons to ring-methylated derivatives thereof. A more specific object is to provide means for controlling the isomeric distribution of products, and to improve the yield of desired product. Still another object is to provide highly stable and active catalysts for the hydrogenolysis of aromatic chloromethyl compounds. Other specific objects include providing economical means for converting pseudocumene to durene, benzene to xylenes, toluene to xylenes, cumene to p-cymene, naphthalenes to methylnaphthalene, etc. Other objects will be apparent from the following description.

The process of this invention is especially adapted for the conversion of pseudocumene to durene. Durene is a hydrocarbon which, because of its symmetry, is of great potential interest as a raw material in the chemical industries. It may for example be converted to a symmetrical tetracarboxylic acid by oxidation, and this acid in turn is useful for the preparation of interesting polymeric esters, amides and the like. For these reasons and others there is much current interest in devising practical and economical methods for obtaining durene in pure form.

Durene occurs in various coal tar and petroleum fractions, especially in gasoline fractions prepared by catalytic reforming. However, the quantity of durene present is relatively small and, due to the presence of other like-boiling isomers, is relatively difficult to isolate in pure form. Pseudocumene on the other hand is present in considerable proportions in naphtha reformates, e.g. up to about 10%, and is quite readily isolated in pure form by distillation, since none of the other isomers thereof are particularly troublesome from the standpoint of similarity in chemical and physical properties.

The resolution of isomeric mixtures of xylenes and ethylbenzenes is a difficult problem of long standing. Equilibrium mixtures of these isomers occur in petroleum fractions, but the separation of pure para-xylene therefrom is even more difficult than the separation of durene. However, toluene occurs in large quantities in naphtha reformates, and is readily isolated therefrom. According to this invention, toluene may be chloromethylated to produce only the ortho and para isomers. Upon dechlorination, the product is a simple mixture of ortho and para-xylene which is quite readily separable by fractional distillation, since there is a 6° C. difference in boiling points between the two isomers. The process of this invention hence provides a method for synthesizing p-xylene from toluene, which entirely avoids the difficult meta-para-isomer separation problems. Benzene may also be subjected to di-chloromethylation to give similar results.

Another hydrocarbon which is difficult to separate from its isomers is para-cymene, this separation being even more difficult than the xylene separation. According to this invention however, cumene may be chloromethylated and then dechlorinated to give predominantly para-cymene. In this case, the production of para-isomer formed is even greater than the proportion of para-xylene formed from toluene. This is due to the steric effect of the isopropyl group which hinders ortho substitution.

Other aromatic hydrocarbons which may be treated herein include for example tert-butyl benzene, ethylbenzene, the xylenes, o-, m- or p-cymene, dodecyl benzene, diphenyl, naphthalene, anthracene, phenanthrene, diphenyl methane, triphenyl methane, or any alkylated derivatives of the foregoing, provided that at least one ring position is open for chloromethylation. Where more than one ring position is unsubstituted, the chloromethylation may be controlled to give either mono- or polychloromethylation, as desired. This is accomplished by known means, involving mainly providing appropriate mole-ratios of reactants, and/or by appropriately limiting the contact time and/or temperature to control degree of conversion. In some instances mixtures of mono- and poly-chlorinated compounds are obtained. These mixtures may either be resolved by e.g. distillation, or the mixture may be dechlorinated to give an analogous mixture of hydrocarbons. Where only mono-chloromethylation is desired, it is preferable to limit the conversion to e.g. 40–95% in most cases.

Reference is now made to the accompanying drawing which is a diagrammatic flow sheet illustrating a particularly advantageous combination of chloromethylation and dechlorination as applied to the manufacture of durene. It will be understood however that the invention is not limited to these details and that the same identical process may be applied to the treatment of benzene, toluene, cumene or other aromatic hydrocarbons.

The chloromethylation is conducted in liquid-liquid contacting column 2, which is preferably a conventional packed column or other contacting apparatus adapted to effect intimate contact between countercurrently flowing liquid phases. Chloromethylation is here conducted at temperatures of e.g. 25° to 150° C., and at any desired pressure, and at contact times between about 0.5 and 8 hours. Preferably, atmospheric pressure is employed. The pseudocumene is brought in through line 4, mingled with recycle pseudocumene from line 6, and transferred via line 8 to the bottom of column 2, and flows upwardly therein. Formaldehyde plus a small make-up portion of hydrochloric acid is brought in via line 10 and mixed therein with recycle aqueous hydrochloric acid in line 12. The mixture then flows into the top of column 2 and downwardly therein.

The chloromethylated pseudocumene, plus unreacted pseudocumene, is taken off via line 14 and is then preferably passed through a drying chamber 16 filled with silica gel or other suitable desiccant. The dried product is then taken off via line 18 where it mingles with recycle hydrogen from line 20 and fresh make-up hydrogen from line 22. The mixture is then preheated in heater 24 to the desired temperature for dechlorination, i.e., between about 100° and 350° C., preferably between about 150° and 250° C. The combined mixture in vapor phase is then transferred via line 26 to dechlorination reactor 28, which is packed with suitable catalyst 30. Operative reaction conditions for the dechlorination include mole-ratios of hydrogen/chloromethyl compound between about 1/1 and 20/1, liquid hourly space velocities between about 0.2 and 10.0, preferably about 0.5 to 5. Preferably atmospheric pressure is employed, but super-atmospheric pressures or reduced pressures may also be utilized.

All of the foregoing apparatus and transfer lines should preferably be glass-lined or Teflon-lined, or lined with other inert material. The chloromethylated compounds tend to corrode ferrous metals, and the metals catalyze the decomposition and polymerization of the chloromethyl compounds. The use of glass-lined equipment is entirely feasible since both steps of the process are preferably carried out at atmospheric pressure and moderate temperatures.

The products from reactor 28 are withdrawn via line 32, then cooled to e.g. 25° to 100° C. in cooler 34 to effect condensation of the hydrocarbons. The partly condensed mixture is then passed into a gas-liquid separator 36, from which unreacted hydrogen and hydrogen chloride generated in reactor 28 are withdrawn via line 38. The liquid product in separator 36 is then transferred to fractionating column 40 via line 42, from which product durene is withdrawn as bottoms in line 44. The overhead consists of unreacted pseudocumene which is withdrawn via line 46, condensed in condenser 48, and recycled to line 4 as previously described.

The spent aqueous phase from chloromethylation reactor 2 is withdrawn via line 50, and consists of a relatively dilute aqueous solution of formaldehyde and HCl. This aqueous phase is then transferred to the top of stripping column 52, through which the hydrogen-HCl mixture from line 38 passes countercurrently. The aqueous phase scrubs the bulk of the HCl from the gas phase and relatively pure hydrogen is taken off through line 20 for recycle as previously described.

The HCl-enriched aqueous phase from stripping column 52 is withdrawn via line 54 and recycled via line 12 as previously described. A slip-stream from line 54 is withdrawn via line 56 and transferred to a small distillation column 58 to separate overhead a small portion of water in line 60. The portion of water withdrawn should be approximately equivalent to the amount of water synthesized in reactor 2, to prevent build-up of water in the system. The slip-stream of concentrated hydrochloric acid is then returned to line 54 via line 62.

It will thus be seen that the combined process consumes substantially only hydrogen, pseudocumene and formaldehyde; only sufficient HCl need be added to the system to compensate for unavoidable small losses thereof. It will be seen also that the depleted aqueous phase from reactor 2 provides a highly advantageous stripping medium which effects a recovery and separation of the hydrogen and HCl from reactor 28, for economical recycle in the process.

The reaction conditions for chloromethylation and dechlorination outlined above are also operable for the treatment of other hydrocarbons within the scope of this invention. Preferred conditions will vary with different feeds, but the principal requirements are simply to maintain suitable conditions for liquid phase operation in reactor 2, and vapor phase or liquid phase operation (preferably vapor phase) in reactor 28.

The dechlorination catalysts of this invention may comprise any one or more of the noble metals supported in finely divided form on a suitable neutral salt carrier which is nonreactive with HCl or the chloromethylated hydrocarbons. The active metals include palladium platinum, rhodium, iridium, ruthenium and osmium. The preferred metals are palladium and platinum. Copper may also be used to somewhat less advantage. These active metals can be distended on the carrier by any conventional method as for example by impregnation, coprecipitation, and the like. For example, the carrier may be immersed in a dilute aqueous solution of palladium chloride or chloroplatinic acid, then drained and dried and reduced with hydrogen to form the free metal. Very minor amounts of active metal are operative, and it is preferred to use amounts between about 0.01% and 2% by weight. The finished catalyst may be employed in powder form, or it may be compressed into tablets in the conventional manner.

Suitable carriers for use herein include sodium sulfate, potassium sulfate, lithium sulfate, barium sulfate, strontium sulfate, calcium sulfate, magnesium sulfate, beryllium sulfate, the corresponding chlorides of these metals, or any other suitably insert, non-acidic (neutral) salt of an alkali metal or alkaline earth metal. As mentioned above, it is essential that the carrier be non-acidic; carriers such as silica gel and activated carbon are apparently too acidic, inasmuch as catalysts based thereon have been found to decline rapidly in activity.

The following examples are cited to illustrate the results obtainable herein but are not intended to be limiting in scope.

EXAMPLE 1

A. Chloromethylation of pseudocumene

To a 1-liter 3-necked flask equipped with an efficient stirrer, thermometer and condenser was added 30 g. (1 mole) of paraformaldehyde, 250 ml. (3 moles) of concentrated HCl and 240 g. (2 moles) of pseudocumene.

The mixture was stirred vigorously and heated at 60°–70° C. for 2.5 hours then cooled to room temperature and the phases separated. The hydrocarbon phase weighed 280 g. and was dried over $K_2CO_3$. The dry product was subjected to distillation thru a vigreoux column at 6 mm. Hg. The product (mainly 5-chloromethyl pseudocumene) was collected at 110° C./5 mm. and weighed 124.8 g. (74% yield, based on formaldehyde).

B. Hydrogenolysis of chloromethyl pseudocumene

The product from A above was passed in vapor phase through a U-tube packed with catalyst consisting of 0.5% by weight of palladium impregnated in the form of the chloride on granular barium sulfate. The U-tube was immersed in a bath of refluxing tetralin. Reaction conditions were: temperature 205° C., liquid hourly space velocity 1.0, mole ratio of $H_2$/chloromethyl pseudocumene 15/1. The condensed products from successive 1-hour runs analyzed as follows:

| Run No. | Total percent Yield of C-12 Hydrocarbons | Analysis of product, mole-percent | | |
|---|---|---|---|---|
| | | Durene | Isodurene | Prehnitene |
| 1 | 83.5 | 72 | 3 | 25 |
| 2 | 96 | 73 | 3 | 24 |
| 3 | 98 | 75 | 2 | 23 |

Durene has a melting point of 80° C., while isodurene and prehnitene melt at −24° and −4° C., respectively. The bulk of the durene is hence readily recovered from the mixture by crystallization. However, fractional distillation is generally preferable, since durene boils about 10° C. lower than prehnitene.

Operation as described above was continued for six hours with no apparent loss in activity of the catalyst.

EXAMPLE 2

The catalyst of Example 1–B was also employed for dechlorinating the crude mixture of pseudocumene and chloromethyl pseudocumene from 1–A. At LHSV 4.0, temperature 205° C., and a 10/1 mole ratio of $H_2$/chloromethyl pseudocumene, a water-white product containing substantial amounts of durene was obtained over an 8-hour period. Thus, after a total contact time of 14 hours, the catalyst had maintained its original activity.

EXAMPLE 3

Another catalyst was prepared by impregnating 100 grams of 6–8 mesh calcium sulfate ("Drierite") with 50 ml. of a solution containing 0.74 gms. of $PdCl_2$. The resulting catalyst, after drying at 100° C., contained about 0.5% Pd.

This catalyst was then employed for the hydrogenolysis of chloromethyl pseudocumene under the conditions of Example 1–B. Substantially the same results were obtained, and the catalyst maintained its original activity over the entire 6-hour run.

EXAMPLE 4

The following catalysts were also tested for the hydrogenolysis of chloromethyl pseudocumene under the conditions of Example 1–B:

(1) 0.5% Pd on silica gel
(2) 0.5% Pd on activated carbon
(3) 0.35% Pt on silica-alumina carrier Catalysts 1 and 2 were initially active, but after about 1 hour lost substantially all activity, the feed being recovered substantially unchanged. Catalyst No. 3 appeared to be active for about 5 minutes but then lost all activity.

EXAMPLE 5

A mixture of p- and o-chloromethyl toluene is contacted with a 0.5% Pt-$K_2SO_4$ catalyst at 2.0 space velocity, 150° C., atmospheric pressure, using 10 moles of $H_2$ per mole of feed. A substantially quantitative conversion to o- and p-xylene is obtained, and essentially pure p-xylene is readily recovered by distillation.

EXAMPLE 6

A sample of cumene is subjected to chloromethylation under the general conditions described in Example 1–A, using about 0.3 mole of paraformaldehyde per mole of toluene, and allowing the reaction to go substantially to completion. The product recovered from this reaction is highly enriched p-chloromethyl cumene.

Upon subjecting the p-chloromethyl cumene to hydrogenolysis over a 0.5% Pd-calcium chloride catalyst, there is a substantially quantitive conversion to p-cymene.

The foregoing examples are not intended to be restrictive in scope. The same conditions of reaction described in the examples may also be employed for the treatment of other aromatic hydrocarbons disclosed herein. Likewise, any of the noble metals, or mixtures thereof may be substituted for the catalysts of the examples with substantially equivalent results. The true scope of the invention is intended to be embraced within the following claims.

We claim:

1. A method for the hydrogenolysis of a chloromethylated aromatic hydrocarbon, which comprises contacting said chloromethylated hydrocarbon plus added hydrogen with a catalyst comprising a minor proportion of finely divided noble metal supported on a carrier selected from the group consisting of the substantially neutral and non-reactive salts of the alkali metals and alkaline earth metals at a temperature between about 100° and 350° C., and recovering therefrom a hydrocarbon containing a ring methyl group in place of the chloromethyl group of said chloromethylated hydrocarbon.

2. A method as defined in claim 1 wherein said carrier is barium sulfate.

3. A method as defined in claim 1 wherein said carrier is calcium sulfate.

4. A method as defined in claim 1 wherein said carrier is magnesium sulfate.

5. A method as defined in claim 1 wherein said carrier is strontium sulfate.

6. A method as defined in claim 1 wherein said carrier is calcium chloride.

7. A method as defined in claim 1 wherein said carrier is an alkaline earth metal sulfate and said noble metal is palladium.

8. A method as defined in claim 1 wherein said carrier is an alkaline earth metal sulfate and said noble metal is platinum.

9. A method for converting sym. chloromethyl pseudocumene to durene, which comprises contacting said sym. chloromethyl pseudocumene plus added hydrogen with a catalyst comprising a minor proportion of finely divided noble metal supported on a carrier selected from the group consisting of the substantially neutral and non-reactive salts of the alkali metals and alkaline earth metals, at a temperature between about 100° and 350° C., and recovering durene therefrom.

10. A method as defined in claim 9 wherein said carrier is barium sulfate.

11. A method as defined in claim 9 wherein said carrier is calcium sulfate.

12. A method as defined in claim 9 wherein said carrier is an alkaline earth metal sulfate and said noble metal is palladium.

13. A method as defined in claim 9 wherein said carrier is an alkaline earth metal sulfate and said noble metal is platinum.

14. A process for converting an aromatic hydrocarbon to a ring-methylated derivative thereof, which comprises contacting said aromatic hydrocarbon in the liquid phase with an aqueous phase comprising formaldehyde and hydrogen chloride to effect chloromethylation, recovering from said contacting an aqueous phase depleted in formaldehyde and hydrogen chloride and an organic phase containing chloromethylated hydrocarbon, subjecting said chloromethylated hydrocarbon to catalytic hydrogenolysis to effect dechlorination with resultant formation of hydrogen chloride and said ring-methylated derivative, partially condensing the product from said hydrogenolysis to recover said ring-methylated derivative and a gas phase containing hydrogen chloride and hydrogen, scrubbing said gas phase with the aqueous phase from said chloromethylation, and recovering from said scrubbing (1) a purified hydrogen stream for recycle to said hydrogenolysis step, and (2) a hydrogen chloride-enriched aqueous phase for recycle to said chloromethylation step.

15. A process as defined in claim 14 wherein said aromatic hydrocarbon is pseudocumene, and said ring-methylated derivative is durene.

16. A process as defined in claim 15 wherein said hydrogenolysis is carried out at a temperature between about 100° and 350° C., in the presence of a catalyst comprising a minor proportion of finely divided noble metal supported on a carrier which is essentially an alkaline earth metal sulfate.

References Cited in the file of this patent
UNITED STATES PATENTS

| | | |
|---|---|---|
| 2,765,350 | Conrad | Oct. 2, 1956 |
| 2,803,679 | Conrad | Aug. 20, 1957 |
| 2,866,828 | Crowder et al. | Dec. 30, 1958 |

FOREIGN PATENTS

| | | |
|---|---|---|
| 509,149 | Germany | Oct. 8, 1930 |

OTHER REFERENCES

Brown et al.: "Berichte," 1934, volume 67, pages 1094–1099.